Dec. 30, 1969 D. F. GRIEPENTROG 3,487,339

INTERMEDIATE FREQUENCY COUPLING NETWORK HAVING A SHARPLY TUNED SOUND CARRIER CANCELLATION TRAP INDUCTIVELY COUPLED TO THE INPUT CIRCUIT

Filed Jan. 4, 1967

INVENTOR:-
DAL F. GRIEPENTROG
BY Eugene M. Whitacre
Attorney

United States Patent Office 3,487,339

Patented Dec. 30, 1969

3,487,339

INTERMEDIATE FREQUENCY COUPLING NETWORK HAVING A SHARPLY TUNED SOUND CARRIER CANCELLATION TRAP INDUCTIVELY COUPLED TO THE INPUT CIRCUIT

Dal Frank Griepentrog, Indianapolis, Ind., assignor to RCA Corporation, a corporation of Delaware Filed Jan. 4, 1967, Ser. No. 607,206

Int. Cl. H01h *7/10*

U.S. Cl. 333—76 9 Claims

ABSTRACT OF THE DISCLOSURE

An intermediate frequency interstage coupling network including a broadly tuned input circuit and a broadly tuned output circuit which are capacitively coupled, and a sharply tuned sound carrier cancellation trap circuit which is inductively coupled to the input circuit. The trap circuit is electrically connected in series with the output circuit between an output terminal and a point of reference potential. Impedance means may be connected with the output circuit and a sound trap to optimize cancellation of the sound carrier frequency which is induced into the output circuit.

This invention relates to signal coupling networks and more particularly to intermediate frequency interstage coupling networks for television receivers.

In color television receivers, as in monochrome receivers, an intermediate frequency (I.F.) signal comprising respectively picture and sound carrier waves is amplified in a common I.F. amplifier. The carrier waves are coupled from the output of the I.F. amplifier to separate sound and video detectors. For reasons to be set forth, it is important that the sound carrier wave be attenuated before application of the I.F. signal to the video detector, in order to reduce the amplitude of a 920 kHz. beat frequency between the color subcarrier, which is at 42.17 mHz., and the sound subcarrier, which is at 41.25 mHz. Otherwise, the 920 kHz. frequency beat will produce a highly visible pattern in the reproduced color picture.

To prevent degradation of the color picture, interstage intermediate frequency coupling networks have been devised to provide attenuation of the 41.25 mHz. sound carrier frequency. Prior circuits designed to accomplish this result (by utilization of double tuned coupling circuits) have been complicated and difficult to manufacture because they required tapped coils or complex multi-winding transformers.

Another object of the invention is to provide a double tuned circuit, for coupling the I.F. amplifier to the video detector which is generally of simpler and less costly construction than those heretofor employed.

Another object of the invention is to provide an improved double tuned I.F. coupling network which is easy to manufacture and does not require tapped coils or complex multiwinding transformers.

An intermediate frequency interstage coupling network embodying the invention includes a broadly tuned input circuit and a broadly tuned output circuit which are capacitively coupled and a sharply tuned sound carrier cancellation trap circuit which is inductively coupled to the the input circuit. The trap circuit is electrically connected in series with the output circuit between an output terminal and a point of reference potential. Impedance means may be connected with the output circuit and sound trap to optimize cancellation of the sound carrier frequency which is induced into the output circuit.

Other objects, features, and advantages will appear from the drawings and descriptions hereinafter given. Referring to the drawings.

Figure 1:
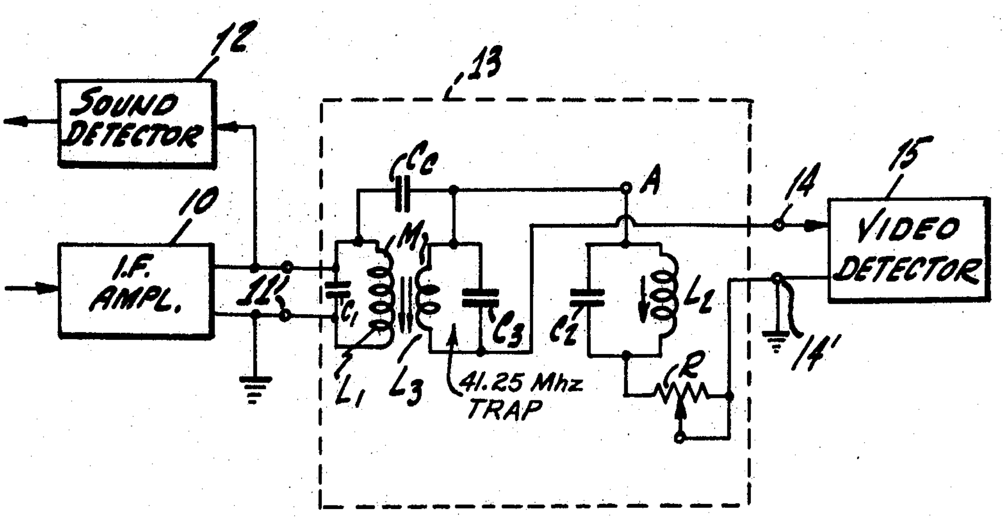
FIGURE 1 is a schematic circuit diagram partially in block form illustrating a coupling circuit embodying the present invention.

In the circuit of FIGURE 1 intermediate frequency signal sound and picture carriers appear across terminals 11 of the last I.F. amplifier 10 of a color television receiver. The sound and picture carriers are mixed in a detector 12 to derive a 4.5 mHz. intercarrier beat signal which is fed to the sound channel of the receiver (not shown).

The output terminals 11 of the I.F. amplifier 10 are also connected to a first parallel resonant circuit including a network 13 comprising variable inductor $L_1$ in parallel with a capacitor $C_1$. A coupling capacitor $C_c$ is connected from the first resonant circuit to a second resonant circuit which includes the parallel combination of a variable inductor $L_2$ and a variable capacitor $C_2$. The output portion of coupling network 13 includes the series combination of the second resonant circuit with a relatively sharply tuned parallel resonant sound trap, comprising a variable inductor $L_3$ and parallel capacitor $C_3$, and a variable resistor R all connected between output terminals 14 and 14', the latter being at ground or reference potential. The video detector 15 is connected across terminals 14.

Figure 2:
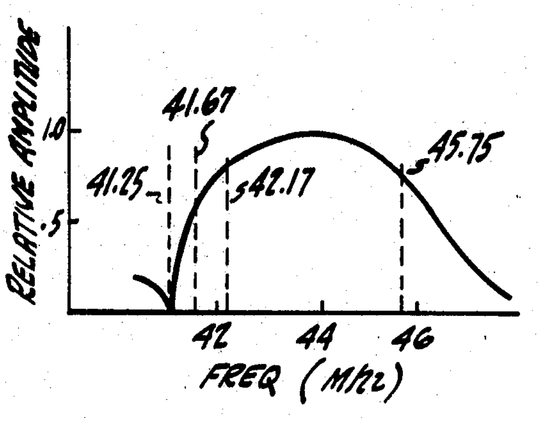
FIGURE 2 is a graph illustrating the response curve of the network shown in FIGURE 1.

FIGURE 2 illustrates the typical response curve obtained from a coupling circuit embodying the instant invention. The specific frequencies marked on the curve are: the sound carrier frequency 41.25 mHz., the color subcarrier 42.17 mHz., the edge of the color information which is 500 kHz. below the color subcarrier 41.67 mHz., and the 45.75 mHz. video carrier frequency. A rejection of 60 decibels of the 41.25 mHz. sound carrier has been obtained. Also the amplitude of the overall video response is 70% of maximum at 41.67 mHz.

By way of example, typical values for the components shown and described above are:

| | |
|---|---|
| $L_1$—7.5 turns | $L_3$—2.5 turns |
| $C_1$—22 pf | $C_3$—150 pf |
| $L_2$—15½ turns | $C_c$—2 pf |
| $C_2$—7 pf | R—0–1k ohms |

The inductors are wound on separate ⁵⁄₁₆" diameter coil forms with number 20 wire, with a spacing of 20 turns per inch, and are tuned by adjustable cores positioned inside the coil form. Inductor $L_1$ is located ⅝" away from trap inductor $L_3$ to provide proper coupling. The location of the inducor $L_2$ with respect to that of $L_1$ and $L_3$ is noncritical.

A brief description of the circuit operation follows. The first and second resonant circuits $L_1$ $C_1$ and $L_2$ $C_2$ are broadly tuned to 43.5 mHz. The trap $L_3$ $C_3$ is sharply tuned to 41.25 mHz. and possesses a relatively high Q with a frequency band pass characteristic sufficient to encompass the sound carrier frequencies. The I.F. signal appearing across the first resonant circuit $L_1$ $C_1$ is capacitively coupled by $C_c$ to the second resonant circuit $L_2$ $C_2$. Depending on the value of the resistance R, the voltage from the top of $L_2$ $C_2$ to ground will phase lead voltage across $L_1$ $C_1$ by a maximum angle approaching 180°. This voltage is applied to the output terminal 14 through the trap $L_3$ $C_3$. The inductor $L_3$ of the trap is loosely inductively coupled to the input circuit $L_1$ $C_1$ such that the voltage induced across $L_3$, lags in phase the voltage across $L_1$ $C_1$. By tuning $L_3$, the amount of this phase lag can be varied. The values of the inductors $L_1$, $L_2$ and $L_3$ are adjusted to desired values by suitable positioning of the core contained within the coil forms.

The inductor $L_3$ is adjusted so that the 41.25 mHz. sound carrier frequency induced into the sound trap is substantially equal to, but 180° out of phase with respect to that appearing across said second tuned circuit $L_2$–$C_2$, thus causing a cancellation of the sound carrier frequency. The variable resistance R is adjusted to vary the amplitude and phase of the voltage in said second resonant circuit to optimize the rejection of the sound carrier wave. In practice, this method has produced approximately 60 db rejection of the sound carrier frequency at the output terminals.

Figure 3:
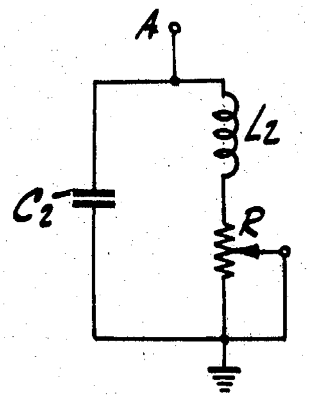
FIGURE 3 is a schematic circuit diagram illustrating an alternate output circuit for the coupling network shown in FIGURE 1.

It has been found that the resistor may be placed in series with $L_2$ as part of the second resonant circuit as is illustrated in FIGURE 3 which circuit is connected between terminal A and ground. The resistance in this location will vary the Q of the second tuned circuit and thus effect changes in amplitude and phase. Further, careful selection of the degree of inductive coupling between $L_1$ and $L_3$ and the Q of the respective coils will entirely obviate the necessity of this resistor.

Because of the design of the coupling network, considerable cost savings are realized. Specifically, this network is readily adaptable to satisfy a wide variety of critical circuit demands as found in different receiver types; for example, changes in coupling between the input and output portions of the circuit are accomplished by simply changing the value of the coupling capacitor $C_c$, as opposed to using a different transformer assembly to achieve a different value of coupling. Further, only simple untapped adjustable core tuned coils are used rather than complex inductor assemblies. In addition, the second tuned circuit may be placed away from the first tuned input circuit of the network; consequently, its location can be selected with greater latitude as to achieve greater economy in space utilization.

What is claimed is:

1. An intermediate frequency coupling network for television receivers of the type having an intermediate signal frequency channel for translating the sound and picture carriers of a received television signal;

first and second parallel resonant circuits relatively broadly tuned to provide a frequency bandpass characteristic encompassing the frequency bands occupied by said sound and picture carriers;

means for applying an intermediate frequency television signal including said sound and picture carriers to said first resonant circuit;

means for capacitively coupling said second resonant circuit to said first resonant circuit;

a third parallel resonant circuit inductively coupled to said first resonant circuit, said third resonant circuit being relatively sharply tuned to the frequency of said sound carrier;

means coupling said second and third resonant circuits in series in a sense that signals of the sound carrier frequency coupled to said second tuned circuit are opposite in phase to the signals of the sound carrier frequency induced in said third tuned circuit; and utilization means coupled across the series combination of said second and third resonant circuits.

2. An intermediate frequency coupling network as defined in claim 1 including variable resistance means in said series circuit including said second and third resonant circuits for adjusting the degree of cancellation of said sound carrier.

3. A coupling network as claimed in claim 2 wherein said parallel resonant circuits comprise parallel connected capacitance and inductance means.

4. A network for use in color television receivers for coupling intermediate frequency signals from the I.F. amplifier to the video detector while providing cancellation at the sound carrier frequency comprising:

a first tuned input circuit operative to pass said intermediate frequencies;

means coupling the output from said intermediate frequency amplifier to said first tuned input circuit;

a second tuned circuit operative to pass said intermediate frequencies;

capacitance means coupling said first tuned circuit to said second tuned circuit;

a parallel resonant sound frequency trap circuit inductively coupled to said first tuned input circuit;

an output terminal;

and means serially connecting said trap circuit and said second tuned circuit between said output terminal and a reference potential.

5. A coupling network as claimed in claim 4 wherein said tuned circuit and said trap circuit each comprise parallel connected capacitance and inductance means.

6. A coupling network as claimed in claim 4 which further comprises resistance means connected so as to govern the amplitude and phase of the signals in said second tuned circuit with respect to the signals in said trap circuit so that maximum cancellation of the sound carrier frequency is achieved.

7. A coupling network as claimed in claim 6 in which said resistance means is connected in series with said second tuned output circuit between said output terminal and said reference potential.

8. A coupling network as claimed in claim 6 in which said resistance means is connected so as to control the Q of said tuned output circuit.

9. An intermediate frequency coupling network comprising:

an input portion including a first tuned resonant circuit;

means for coupling the output from the intermediate frequency amplifier across said input portion;

an output portion comprising a second tuned resonant circuit, a parallel resonant trap circuit, and a resistance all serially connected between an output terminal and a reference potential;

capacitive coupling means for coupling said first tuned resonant circuit to said second tuned resonant circuit and;

means for inductively coupling said first tuned resonant circuit to said trap circuit.

References Cited

UNITED STATES PATENTS

| | | | |
|---|---|---|---|
| 3,019,401 | 1/1962 | Hever | 333—76 X |
| 3,029,400 | 4/1962 | Nelson | 333—76 X |
| 3,114,889 | 12/1963 | Avins | 333—76 |

HERMAN KARL SAALBACH, Primary Examiner

T. VEZEAU, Assistant Examiner

U.S. Cl. X.R.

325—477; 333—77